(12) United States Patent
Arcas et al.

(10) Patent No.: US 9,659,406 B2
(45) Date of Patent: May 23, 2017

(54) PROCEDURAL AUTHORING

(71) Applicant: Microsoft Technology Licensing, LLC, Redmond, WA (US)

(72) Inventors: Blaise Aguera Y. Arcas, Seattle, WA (US); Brett D. Brewer, Sammamish, WA (US); Steven M. Drucker, Bellevue, WA (US); Karim T Farouki, Seattle, WA (US); Gary W. Flake, Bellevue, WA (US); Stephen Lawler, Redmond, WA (US); Donald J. Lindsay, Mountain View, CA (US); Adam P Sheppard, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/286,264

(22) Filed: May 23, 2014

(65) Prior Publication Data

US 2014/0254921 A1    Sep. 11, 2014

Related U.S. Application Data

(63) Continuation of application No. 12/116,323, filed on May 7, 2008, now Pat. No. 8,737,721.

(51) Int. Cl.

| G06K 9/00 | (2006.01) |
|---|---|
| G06T 17/10 | (2006.01) |
| G06T 17/00 | (2006.01) |
| G06T 19/20 | (2011.01) |
| G06T 15/00 | (2011.01) |
| G06T 11/00 | (2006.01) |
| G06T 17/20 | (2006.01) |

(Continued)

(52) U.S. Cl.
CPC ............ *G06T 17/10* (2013.01); *G06T 7/55* (2017.01); *G06T 7/97* (2017.01); *G06T 11/001* (2013.01); *G06T 15/00* (2013.01); *G06T 17/00* (2013.01); *G06T 17/20* (2013.01); *G06T 19/20* (2013.01); *G06T 2200/04* (2013.01); *G06T 2207/20212* (2013.01); *G06T 2210/36* (2013.01); *G06T 2219/2016* (2013.01)

(58) Field of Classification Search
USPC ........................................................ 382/154
See application file for complete search history.

(56) References Cited

U.S. PATENT DOCUMENTS

| 5,255,352 A | 10/1993 | Falk |
|---|---|---|
| 5,818,959 A | 10/1998 | Webb et al. |

(Continued)

OTHER PUBLICATIONS

Constructing 3D Models from 2D Materials Using Rhino 3.0, Illustrator CS2 and a Universal X-660 Laser Cutter, Feb. 26, 2007 <<http://images.google.com/imgres?imgurl=http://rainbowlazer.com/wp-content/uploads/2007/02/slant_vase_being_cut2.jpg &imgrefurl=http://rainbowlazercom/%3Fcat%3D4&h=480 &w=640&sz=61&hl=en&start=4&um=1&thnid=FxXK_JTcTSVtEM:7tbnh=103&tbnw=137&prev=/images%, 4 Pages.

(Continued)

*Primary Examiner* — Kathleen Y Dulaney
(74) *Attorney, Agent, or Firm* — Lee & Hayes, PLLC

(57) ABSTRACT

A three dimensional (3D) model of an object or environment may be created from images and other information of the object or environment. The 3D model may be created by aligning the images. The 3D model may include surfaces that are based on surfaces of the object or environment. The 3D model may be displayed, extorted, modified and so on.

20 Claims, 10 Drawing Sheets

(51) Int. Cl.
  *G06T 7/00* (2017.01)
  *G06T 7/55* (2017.01)

(56) References Cited

U.S. PATENT DOCUMENTS

| | | | |
|---|---|---|---|
| 6,009,210 A * | 12/1999 | Kang | G06K 9/00228 345/156 |
| 6,278,460 B1 | 8/2001 | Myers et al. | |
| 6,310,619 B1 | 10/2001 | Rice | |
| 6,456,287 B1 | 9/2002 | Kamen et al. | |
| 6,549,201 B1 | 4/2003 | Igarashi et al. | |
| 6,608,628 B1 | 8/2003 | Ross et al. | |
| 6,795,069 B2 | 9/2004 | Raskar et al. | |
| 6,980,690 B1 * | 12/2005 | Taylor | G06F 3/04845 345/419 |
| 7,065,242 B2 | 6/2006 | Petrov et al. | |
| 7,146,036 B2 * | 12/2006 | An Chang | G06K 9/2036 345/419 |
| 7,212,664 B2 | 5/2007 | Lee et al. | |
| 7,254,265 B2 | 8/2007 | Naske et al. | |
| 7,352,370 B2 | 4/2008 | Wang et al. | |
| 7,436,988 B2 * | 10/2008 | Zhang | G06K 9/00268 382/118 |
| 7,508,977 B2 | 3/2009 | Lyons et al. | |
| 7,542,886 B2 | 6/2009 | Storms et al. | |
| 7,747,067 B2 * | 6/2010 | Popescu | G01B 11/25 382/154 |
| 8,295,589 B2 * | 10/2012 | Ofek | G06K 9/00 382/154 |
| 8,363,930 B1 * | 1/2013 | Francis, Jr. | G06K 9/00214 382/154 |
| 8,743,114 B2 * | 6/2014 | Kim | G06T 15/40 345/419 |
| 8,818,076 B2 * | 8/2014 | Shenkar | G06T 17/05 345/420 |
| 2002/0006217 A1 * | 1/2002 | Rubbert | A61C 7/00 382/131 |
| 2004/0029068 A1 * | 2/2004 | Sachdeva | A61C 7/00 433/24 |
| 2004/0197727 A1 * | 10/2004 | Sachdeva | A61C 7/00 433/24 |
| 2004/0247157 A1 * | 12/2004 | Lages | G06K 9/00805 382/103 |
| 2004/0247174 A1 | 12/2004 | Lyons et al. | |
| 2005/0031193 A1 | 2/2005 | Rutschmann et al. | |
| 2005/0190179 A1 * | 9/2005 | Hong | G06T 15/04 345/419 |
| 2006/0067573 A1 | 3/2006 | Parr et al. | |
| 2006/0110026 A1 * | 5/2006 | Strassenburg-Kleciak | G01C 15/00 382/154 |
| 2007/0065002 A1 * | 3/2007 | Marzell | G06T 17/00 382/154 |
| 2008/0025592 A1 | 1/2008 | Jerebko et al. | |
| 2008/0112610 A1 * | 5/2008 | Israelsen | G06T 17/00 382/154 |
| 2008/0122840 A1 * | 5/2008 | Falco | G06T 15/00 345/420 |
| 2008/0246759 A1 * | 10/2008 | Summers | G06F 3/0304 345/420 |
| 2008/0247636 A1 | 10/2008 | Davis et al. | |
| 2008/0260237 A1 * | 10/2008 | Savolainen | G06K 9/0063 382/154 |
| 2009/0096790 A1 * | 4/2009 | Wiedemann | G06K 9/00201 345/427 |
| 2009/0279784 A1 | 11/2009 | Arcas et al. | |
| 2009/0323121 A1 * | 12/2009 | Valkenburg | G01B 11/002 358/1.18 |
| 2015/0310662 A1 | 10/2015 | Arcas et al. | |

OTHER PUBLICATIONS

Cutler, "Procedural Authoring of Solid Models", Massachusetts Institute of Technology, Aug. 29, 2003, 180 pages.

Lee, et al. "Generating Animatable 3D Virtual Humans from Photographs" Eurographics 2000/M. Gross and F. R. A. Hopgood, Guest Editors. vol. 19 (2000), No. 3. <<http://www.site.uottawa.ca/~wslee/publication/EG2000.pdf. Last accessed Apr. 28, 2008, 10 pages.

Liu, et al., "Multiview Geometry for Texture Mapping 2D Images onto 3D Range Data" in Computer Vision and Pattern Recognition, 2006 <<http://www.cs.hunter.cuny.edu/~joannis/cvpr06.pdf>> Last accessed Apr. 28, 2008, 8 pages.

Office action for U.S. Appl. No. 12/116,323, mailed on Oct. 17, 2012, Arcas et al., "Procedural Authoring", 15 pages.

Office Action for U.S. Appl. No. 12/116,323, mailed on Nov. 14, 2011, Blaise Aguera Y. Arcas, "Procedural Authoring", 22 pgs.

Office action for U.S. Appl. No. 12/116,323, mailed on Mar. 5, 2013, Arcas et al., "Procedural Authoring", 18 pages.

Office action for U.S. Appl. No. 12/116,323, mailed on Aug. 23, 2013, Arcas et al., "Procedural Authoring", 14 pages.

Yang, et al., "Constructing 3D Objects from a Single Sketch", <<http://www.cs.ubc.ca/~zhijin/525report.pdf>> Last accessed Apr. 28, 2008, 10 pages.

"Non-Final Office Action Issued in U.S. Appl. No. 12/116,323", Mailed Date: Jul. 8, 2011, 18 Pages. (MS#322087.01), 18 pages.

Office action for U.S. Appl. No. 14/737,098, mailed on Nov. 23, 2016, Arcas et al., "Procedural Authoring," 10 pages.

* cited by examiner

PROCEDURAL AUTHORING

RELATED APPLICATIONS

This application claims priority to and is a continuation of U.S. patent application Ser. No. 12/116,323, filed on May 7, 2008, the entire contents of which are incorporated herein by reference.

BACKGROUND

Conventionally, browsing experiences related to digital media (e.g., photography, images, video, etc.), web pages, or other web-displayed content are comprised of images or other visual components of a fixed spatial scale, generally based upon settings associated with an output display screen resolution and/or the amount of screen real estate allocated to a viewing application, e.g., the size of a browser that is displayed on the screen to the user. In other words, displayed data is typically constrained to a finite or restricted space correlating to a display component (e.g., monitor, LCD, etc.). Moreover, there is an increasing use of digital media based upon decreased size and cost of related devices (e.g., digital cameras, video cameras, digital video cameras, cellular phones with media capture, etc.) and increased availability, usability, and resolution.

With the increase of such data, mechanisms have been developed to sort and/or classify in order to facilitate summarization or review. As the Internet and private intranets have grown, as user-based connection bandwidths have increased, and as more individuals obtain personal and mobile computing devices, the volume of online data has also increased-such volumes can be overwhelming. With an increase in information comes a need to parse information for relevancy, storage, retrieval, reference, and the like.

One technique for categorizing media content or digital media, such as pictures or video clips, is the use of metadata tags. Tags are keywords associated with a piece of content that can describe the content, or indicate a word, phrase, acronym, or the like pertinent to aspects of the content. Tags are often generated by a content provider (e.g., a publisher, owner, photography, etc.) to associate with media content and to give a short description of the content to a recipient. Such description can be useful to quickly determine whether time should be spent reviewing the content, whether it should be saved and reviewed later, or whether it should be discarded, for instance. In such a manner, tags, subject lines, and the like have become useful to reduce the time required in perusing the massive amounts of data available remotely and/or locally.

SUMMARY

The following presents a simplified summary of the innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

The subject innovation relates to systems and/or methods that facilitate leveraging a 3D object constructed from 2D imagery to generate a model with real world accurate dimensions, proportions, scaling, etc. A content aggregator can collect and combine a plurality of two dimensional (2D) images or content to create a three dimensional (3D) image, wherein such 3D image can be explored (e.g., displaying each image and perspective point) in a virtual environment. A model component can extrapolate a true 3D geometric model from the 3D object in which such model can have true 3D geometry and attributes (e.g., dimensions, proportions, surfaces, scales, lengths, size, color, texture, physical properties, weight, chemical composition, etc.). In other words, the model created can be an accurate representation of a real object within the physical real world based in part upon the 2D images depicting or displaying such real object within the physical real world. In general, the model component can evaluate a 3D object (e.g., sampling objects or features from the real world based from 2D images associated with such 3D object) in order to create a model. Such model can be further analyzed with dimensionality reduction techniques to identify those objects or features that can be reduced to a low-dimensional manifold (e.g., possibly a telephone or a coffee table).

According to one aspect, once the low-dimensional manifold for an object is ascertained (e.g., a true object), that object as well as various associated features can be mapped to a procedural authoring environment. As a result, various features of the object (or the overall representation of the object) can be modified (e.g., twisting a knob or some other tools, etc.). In accordance therewith, 3D objects that accurately depict a scene with as much realism as a photograph can now be modified or authored in much the same way as are virtual worlds in, say, a gaming environment, yet with living photographic quality/detail rather than virtual renditions. In addition to modifying or authoring, the innovation can also provide for a new way of classification as well utilizing automatic tagging. In other aspects of the claimed subject matter, methods are provided that facilitate generating a proportional scaled version of a real object from a 3D object.

The following description and the annexed drawings set forth in detail certain illustrative aspects of the claimed subject matter. These aspects are indicative, however, of but a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

DETAILED DESCRIPTION

Figure 1:
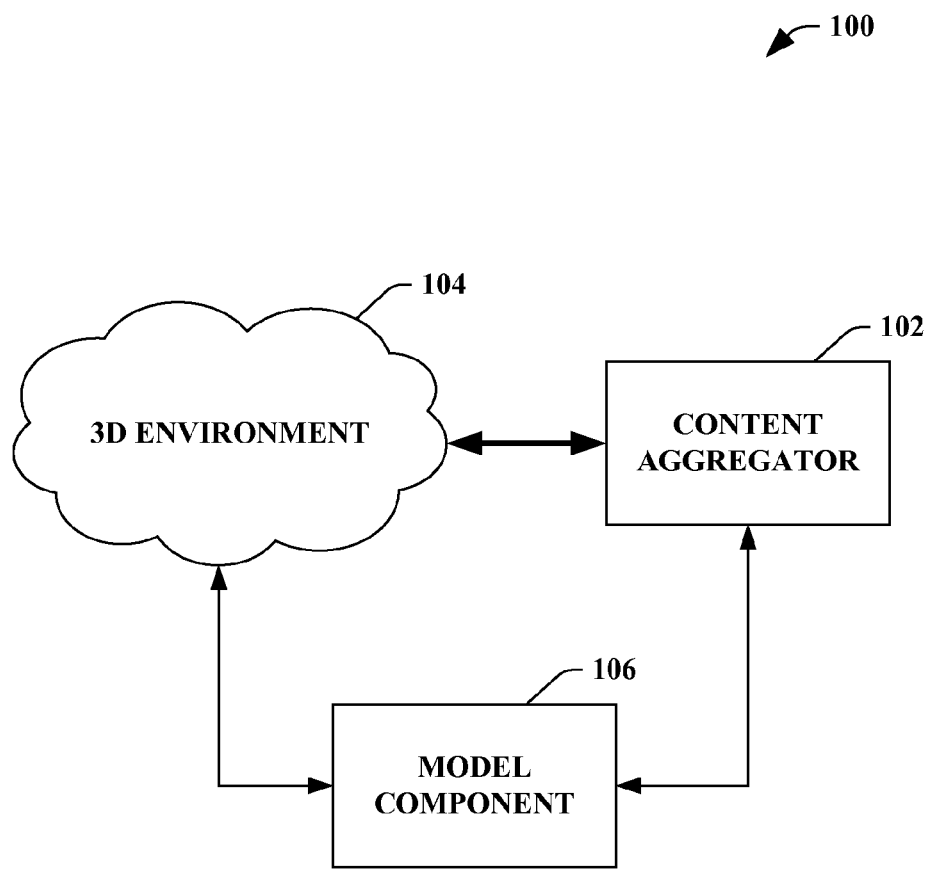
FIG. 1 illustrates a block diagram of an exemplary system that facilitates generating a model with true 3D geometry characteristics from a 3D image or object.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

As utilized herein, terms "component," "system," "data store," "engine," "tagger," "analyzer," "aggregator," "environment," "framework," and the like are intended to refer to a computer-related entity, either hardware, software (e.g., in execution), and/or firmware. For example, a component can be a process running on a processor, a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

Now turning to the figures, FIG. 1 illustrates a system 100 that facilitates generating a model with true 3D geometry characteristics from a 3D image or object. The system 100 can include a content aggregator 102 that can collect a plurality of two dimensional (2D) content (e.g., media data, images, video, photographs, metadata, trade cards, any media representing a portion of a physical real world, a picture of an object, a content representing an item, a content depicting an entity, a corporeal object within the real world, etc.) to create a three dimensional (3D) virtual environment (e.g., a 3D environment 104) that can be explored (e.g., displaying each image and perspective point). For instance, the 3D environment 106 can include two or more 2D images each having a specific perspective or point-of-view. In particular, the 2D images can be aggregated or collected by the content aggregator 102 in order to construct a 3D image or object within the 3D environment 104, wherein construction or assembly can be based upon each 2D image perspective. With this 3D image or object created from two or more 2D images/content, a model component 106 can extrapolate and create a model having true 3D geometry and attributes (e.g., dimensions, proportions, surfaces, scales, lengths, size, color, texture, physical properties, weight, chemical composition, etc.) in which such model can be accurate to the represented 3D image or object representing a portion of a physical real world. The true 3D geometric model created by the model component 106 can be further utilized to identify and tag objects (discussed below) or to create low-dimensional manifolds for identified objects (discussed below).

In order to provide a complete 3D environment 104 to a user within the virtual environment, authentic views (e.g., pure views from images) are combined with synthetic views (e.g., interpolations between content such as a blend projected onto the 3D model). For instance, the content aggregator 102 can aggregate a large collection of photos of a place or an object, analyze such photos for similarities, and display such photos in a reconstructed 3D space to create a 3D object, depicting how each photo relates to the next. Moreover, the 3D image or object within the 3D environment 104 that can be explored, navigated, browsed, etc. It is to be appreciated that the 3D constructed object (e.g., image, etc.) can be from any suitable 2D content such as, but not limited to, images, photos, videos (e.g., a still frame of a video, etc.), audio, pictures, etc. It is to be appreciated that the collected content can be from various locations (e.g., the Internet, local data, remote data, server, network, wirelessly collected data, etc.). For instance, large collections of content (e.g., gigabytes, etc.) can be accessed quickly (e.g., seconds, etc.) in order to view a scene from virtually any angle or perspective. In another example, the content aggregator 102 can identify substantially similar content and zoom in to enlarge and focus on a small detail. The content aggregator 102 can provide at least one of the following: 1) walk or fly through a scene to see content from various angles; 2) seamlessly zoom in or out of content independent of resolution (e.g., megapixels, gigapixels, etc.); 3) locate where content was captured in relation to other content; 4) locate similar content to currently viewed content; and 5) communicate a collection or a particular view of content to an entity (e.g., user, machine, device, component, etc.).

For example, a 3D environment can be explored in which the 3D image can be a cube. This cube can be created by combining a first image of a first face of the cube (e.g., the perspective is facing the first face of the cube), a second image of a second face of the cube (e.g., the perspective is facing the second face of the cube), a third image of a third face of the cube (e.g., the perspective is facing the third face of the cube), a fourth image of a fourth face of the cube (e.g., the perspective is facing the fourth face of the cube), a fifth image of a fifth face of the cube (e.g., the perspective is facing the fifth face of the cube), and a sixth image of a sixth face of the cube (e.g., the perspective is facing the sixth face of the cube). By aggregating the images of the cube based on their perspectives or point-of-views, a 3D image of the cube can be created within the 3D environment 106 which can be displayed, viewed, navigated, browsed, and the like. It is to be appreciated that each of the images for the cube that are aggregated together can share at least a portion of content (e.g., a first image of the cube is a first face and a portion of a second face also contained in the second image, etc.) or a portion of a perspective of the image. Moreover, it is to be appreciated and understood that the angular gap between images can be less than thirty (30) degrees for 3D registration. In another example, an statue can include a plurality of images from varying points of view such that the images capture the statue from all sides. These images can be aggregated and aligned to create a 3D object of the statue.

Following the above example, the photographs or images of the cube can be representative of a cube in a physical real world in which the cube has particular attributes such as size, dimensions, proportions, color, weight, physical properties, chemical compositions, etc. The model component 106 can evaluate the constructed 3D image or object in order to create a model with real life 3D geometry and attributes. Such model generated from the 3D object or image can include accurate dimensions, proportions, scales, lengths, physical properties, surfaces, textures, and the like for the cube in the physical real world. In general, the model component 106 can extrapolate a true 3D geometry of the 3D image or object (here the cube) created from the 3D photographs of such cube. This true 3D model can be imported into other applications, virtual environments, and the like. Moreover, this extrapolated model can be utilized to identify objects or items (e.g., the cube as a whole, an ancillary object within the photos of the cube, etc.) which can be reduced to a low-dimensional manifold (discussed below).

In addition, the system 100 can include any suitable and/or necessary interface component (not shown), which provides various adapters, connectors, channels, communication paths, etc. to integrate the model component 106 into virtually any operating and/or database system(s) and/or with one another. In addition, the interface component can provide various adapters, connectors, channels, communication paths, etc., that provide for interaction with the content aggregator 102, the 3D environment 104, the model component 106, and any other device and/or component associated with the system 100.

Figure 2:
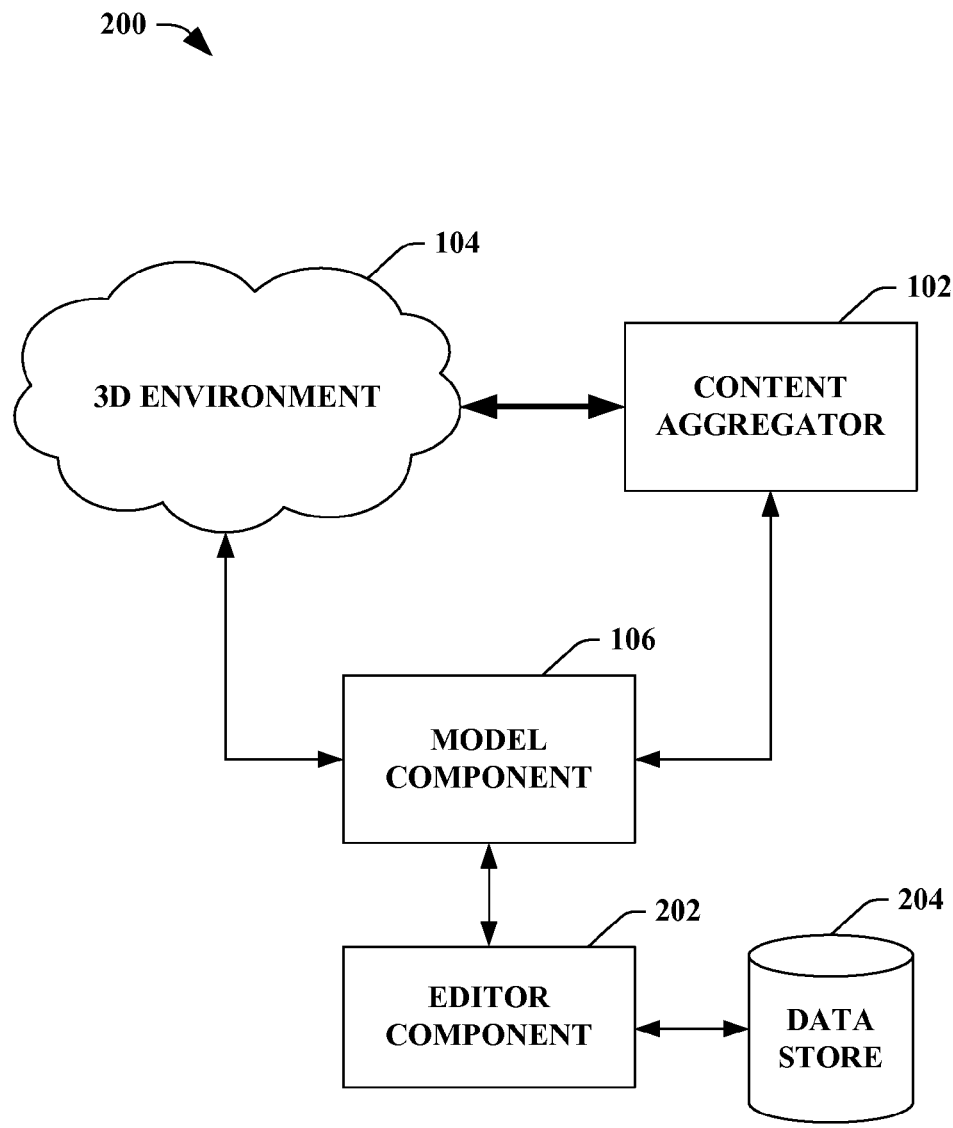
FIG. 2 illustrates a block diagram of an exemplary system that facilitates creating an object from a true 3D geometric model having a low-dimensional manifold.

FIG. 2 illustrates a system 200 that facilitates creating an object from a true 3D geometric model having a low-dimensional manifold. The system 200 can include the model component 106 that can generate a 3D model with true and accurate dimensions to the physical real world in which such 3D model is based upon a 3D object or image constructed from two or more 2D images of an entity (e.g., an item, a person, a landscape, scenery, buildings, objects, animals, devices, goods, etc.) within the physical real world. For instance, the 3D object or image can be created from two or more 2D content (e.g., images, still frames, portion of video, etc.) based upon their perspectives or point-of-views. In general, the content aggregator 102 can collection 2D images related to a particular entity and construct a 3D object within the 3D environment 104 based upon each image's perspective or point-of-view. Such constructed 3D object can be viewed, browsed, navigated, and the like. Moreover, the model component 106 can evaluate the 3D object in order to create a true 3D geometric model of such object or a portion of the object.

For example, a digital camera can capture a plurality of photographs of a house from various angles in a physical real world. From the collection of photographs, a 3D object can be constructed, wherein a portion of the 3D object is represented by a photograph from a perspective or point-of-view from which the photograph was taken. The 3D object can be viewed (e.g., illustrating the 2D content utilized to construct such 3D object of the house), navigated, or browsed. For example, a virtual tour can be given within the 3D environment of the 3D image representing the house. In other words, the house can be represented as a 3D object within the 3D environment constructed from the plurality of photographs taken from the digital camera. Furthermore, the 3D object can be evaluated in order to generate a true 3D geometric model of such house. The true 3D geometric model can have accurate dimensions, proportions, surfaces, scales, lengths, size, color, texture, physical properties, weight, chemical composition, etc., wherein accuracy is in comparison to the house in the physical real world. In other words, the true 3D geometric model can be a computerized replicate of accurate scale and properties of the 3D object or image.

The system 200 can include an editor component 202 that enables a portion of the true 3D geometric model to be modified. In general, the true 3D geometric model can be modified or manipulated in accordance to one's liking. For example, the model component 106 can generate the 3D geometric model in which portions of the model are created with a low-dimensional manifold or having a low-dimension. The editor component 202 enables a low-dimensional manifold or the low-dimensional object associated with the model to be modified or manipulated to create new objects or modified objects from the originally extracted low-dimensional manifold or object.

For instance, dimensionality reduction can be implemented on the true 3D geometric model in order to reduce a high-dimensionality object to a reduced number of dimensions but while maintaining recognizable representation. For instance, a 3D object may be constructed from photos of a human face in which a human face can include a high number of dimensions, yet, the human face can be reduced to a lower number of dimensions and still maintain the recognizable traits (e.g., cheeks, eyes, nose, mouth, etc.). By enabling portions of the true 3D geometric model (based from the 3D object) to be reduced to a low-dimensional manifold, the system 200 can create a virtual representation of a real object (e.g., content from the physical real world is the basis for the object depicted in the content within a virtual reality). Following the example with the house being represented by a 3D object and a true 3D geometric model being extrapolated there from, objects such as a window, a door, or the like can be identified and reduced to low-dimensional manifolds. The editor component 202 can allow such low-dimensional manifolds or identified objects, or the model as a whole to be modified, edited, changed, manipulated, and the like. For example, the door can be modified to be a circular door rather than a standard rectangle door.

In another example, the true 3D geometric model can be of a human face, in which the editor component 202 can allow modification. For instance, eyes on the face can be moved closer together or further apart, the shape can be changed, the cheek bones can be exaggerated, the mouth can be scaled to a smaller size, etc.—the face, in general, can be distorted. The editor component 202 can employ procedural authoring as in creating a new object based off at least one of the low-dimensional manifold created from the true 3D geometric model, a high-dimensional manifold, a portion of the true 3D geometric model, an object or item identified within the true 3D geometric model, or the true 3D geometric model.

It is to be appreciated that surface reconstruction can be used to reconstruct 2D manifolds, or surfaces, from disorganized point clouds (e.g., collection of images, collection of 2D content, etc.). For instance, techniques associated with computer vision can be employed. Moreover, once a point cloud has been converted to a parametrized surface, it can be treated as one instance among an ensemble. For example, synths (e.g., 3D objects, 3D images created from 2D content, etc.) of many faces or multiple synths of a set of French doors can form an ensemble to recover latent degrees of freedom (e.g., eyebrows going up and down, or the doors opening and closing, etc.). Dimensionality reduction can also be used to recover the effects of changing time of day and weather on a 3D object or image, say for instance, the Lincoln Memorial, given a plurality of images of the Lincoln Memorial aggregated or synthed together. In this case, there are not multiple synths or 3D objects, but there are many different time-of-day and weather photos contributing to the synth thus, an ensemble in this case is over renditions of a common patch based on different 2D content or images. In addition, a large ensemble of synths with respect to such surface variations can be used with the substantially similar dimensionality reduction techniques in order to identify common materials and their properties in general under variable lighting and environmental conditions.

The system 200 can further include a data store 204 that can include any suitable data related to the content aggregator 102, the 3D environment 104, the model component 106, etc. For example, the data store 204 can include, but not limited to including, 2D content, 3D object data, 3D true geometric models, extrapolations between a 3D object and a true 3D geometric model, dimensional analysis data, low-dimensional manifold data, manifold data, objects created from the 3D true geometric model, items created from the 3D true geometric model, user preferences, user settings, configurations, scripted movements, transitions, 3D environment data, 3D construction data, mappings between 2D content and 3D object or image, etc.

It is to be appreciated that the data store 204 can be, for example, either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM). The data store 204 of the subject systems and methods is intended to comprise, without being limited to, these and any other suitable types of memory. In addition, it is to be appreciated that the data store 204 can be a server, a database, a hard drive, a pen drive, an external hard drive, a portable hard drive, and the like.

Figure 3:
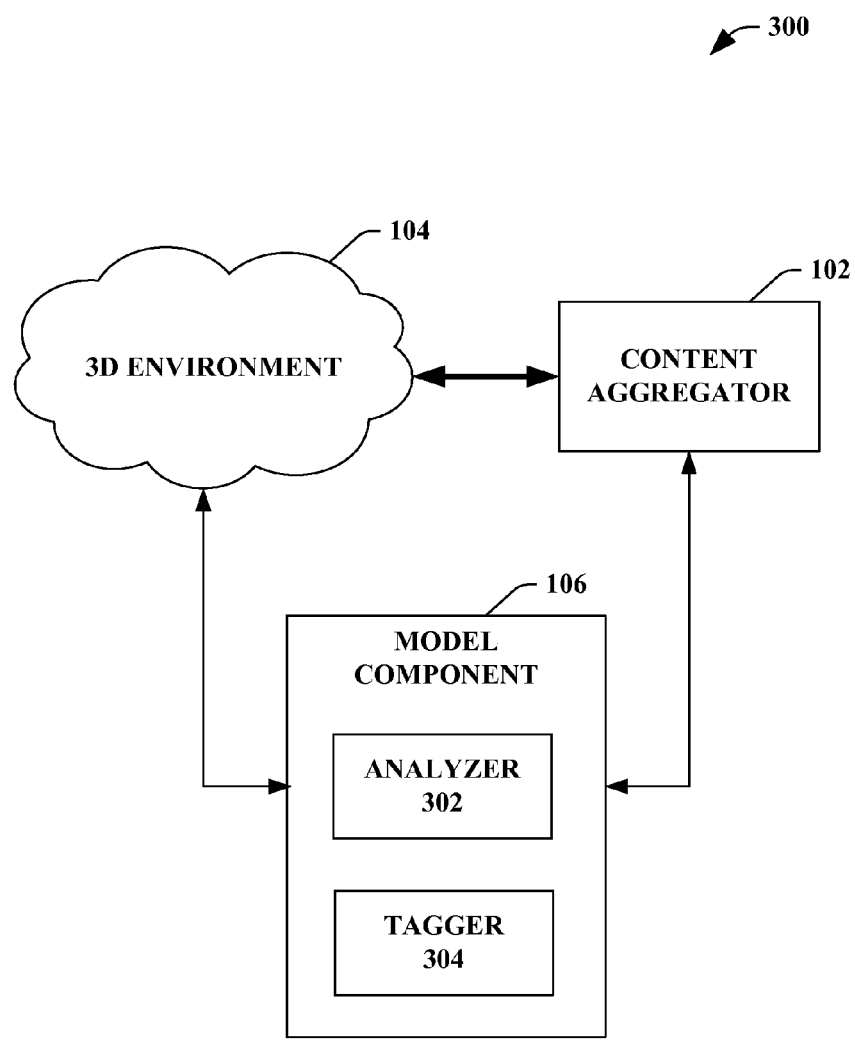
FIG. 3 illustrates a block diagram of an exemplary system that facilitates automatically identifying and tagging objects from a true 3D geometric model created from a 3D image or object.

FIG. 3 illustrates a system 300 that facilitates automatically identifying and tagging objects from a true 3D geometric model created from a 3D image or object. The system 300 can include the content aggregator 102 that can construct a 3D image or object from two or more 2D images or photographs having respective point-of-views of the physical real world. The 3D image or object can be navigated, browsed, viewed, and/or displayed within the 3D environment 104. It is to be appreciated that the 3D environment can be accessed locally, remotely, and/or any suitable combination thereof. Moreover, it is to be appreciated that the 3D image or object and/or the 2D content can be accessed locally, remotely, and/or any suitable combination thereof. For example, a user can log into a first host for the remote 3D environment 104 and access a 3D object in which the 2D content is located on a second host. As described above, the model component 106 can provide dimensional analysis in order to generate a true 3D geometric model having identical attributes to the object in the physical real world of which the 2D content depicts.

In an example, the 2D content can be photographs or video that portrays a car in the physical real world. Such photographs or video can be collected to construct a 3D image within a virtual 3D environment 106 by the content aggregator 102. By assembling the imagery (e.g., photos, video, etc.) based upon a related perspective or point-of-view, the 3D object can be a 3D virtual representation of the car. Such 3D object can be utilized to extrapolate a true 3D geometric model of the car, wherein the model includes accurate size, scaling, proportions, dimensions, etc. For example, a measurement of a wheelbase for the car within the model can be accurate to the wheelbase for the car in the physical real world (e.g., including a scaling factor, without a scaling factor, etc.). The true 3D geometric model can be further utilized to identify objects (e.g., a muffler, a bumper, a light, a windshield wiper, etc.), utilized in other applications or environments (e.g., virtual environments, procedural environments, drafting applications, etc.), utilized to create new objects based on the identified objects (e.g., a modified muffle, a modified bumper, a modification to the car, etc.). In one example, the true 3D geometric model can be utilized to identify a low-dimensional manifold of a car, to which a user can modify such manifold to create a disparate car with a disparate true 3D geometric model.

It is to be appreciated and understood that the true 3D geometric model can be any suitable model with true 3D geometry and attributes (e.g., dimensions, proportions, surfaces, scales, lengths, size, color, texture, physical properties, weight, chemical composition, etc.) in which such model can be accurate to the represented 3D image or object representing a portion of a physical real world (e.g., an entity depicted within the 2D content or images). For example, the true 3D geometric model can be, but is not limited to, a graphical representation, a blueprint, a wire framework, a wire frame, a wire frame model, a skeleton, etc.

The model component 106 can include an analyzer 302 and a tagger 304. The analyzer 304 can evaluate the true 3D geometric model in order to identify an object or item (e.g., also referred to as a true object). In other words, by evaluating the true 3D geometric model, particular portions may be more identifiable as objects in comparison to other objects. Upon identification or an object from the true 3D geometric model being recognized, the tagger 304 can associate a metadata tag or a portion of data describing the object. In one example, dimensional analysis can be utilized to facilitate identifying objects, wherein objects with a low-dimension can be more identifiable than objects with a high dimension. In such example, the low-dimension objects identified can be tagged by the tagger 304. Furthermore, a catalog or data store (e.g., data store 204) can include tagged information.

For instance, following the example of the 3D object of a house created from 2D photographs of a house in the physical real world, the true 3D geometric model can be evaluated utilizing dimensional analysis in order to identify objects. Here, the objects can be a low-dimensional version of the house (e.g., reducing the true 3D geometric model to core features, etc.) or a low-dimensional object included within the photographs of the house such as a shutter, an address plate, a mailbox, a lawn chair, a table, etc. Such identified objects and items can be tagged with metadata for description. Moreover, such identified objects can further be leveraged to identify other objects or items from the true 3D geometric model. For example, an identified lawn chair can be leveraged (e.g., the characteristics, dimensions, attributes, etc.) in order to identify a recliner or any other related variation of the lawn chair.

In another example, based upon recent work associated with modeling human faces, it has been determined that the human face is remarkably well suited to computerized synthesis, whereas for some other objects (e.g., animals) such is not the case. One explanation for this trait is that the human face can be reduced to a low-dimension manifold which allows for ready computational synthesis. The system 300 provides for sampling objects or features from the real world in order to identify those objects or features that can be reduced to a low-dimensional manifold (e.g., possibly a telephone or a coffee table).

According to one aspect, once the low-dimensional manifold for an object is ascertained, that object as well as various associated features can be mapped to a procedural authoring environment. As a result, various features of the object (or the overall representation of the object) can be modified simply by twisting a knob or some other tool in the procedural environment. In accordance therewith, synths (e.g., 3D objects, etc.) that accurately depict a scene with as much realism as a photograph can now be modified or authored in much the same way as are virtual worlds in, say, a gaming environment, yet with living photographic quality/detail rather than virtual renditions. In addition to modifying or authoring, the innovation can also provide for a new way of classification as well (e.g., tagging).

Figure 4:
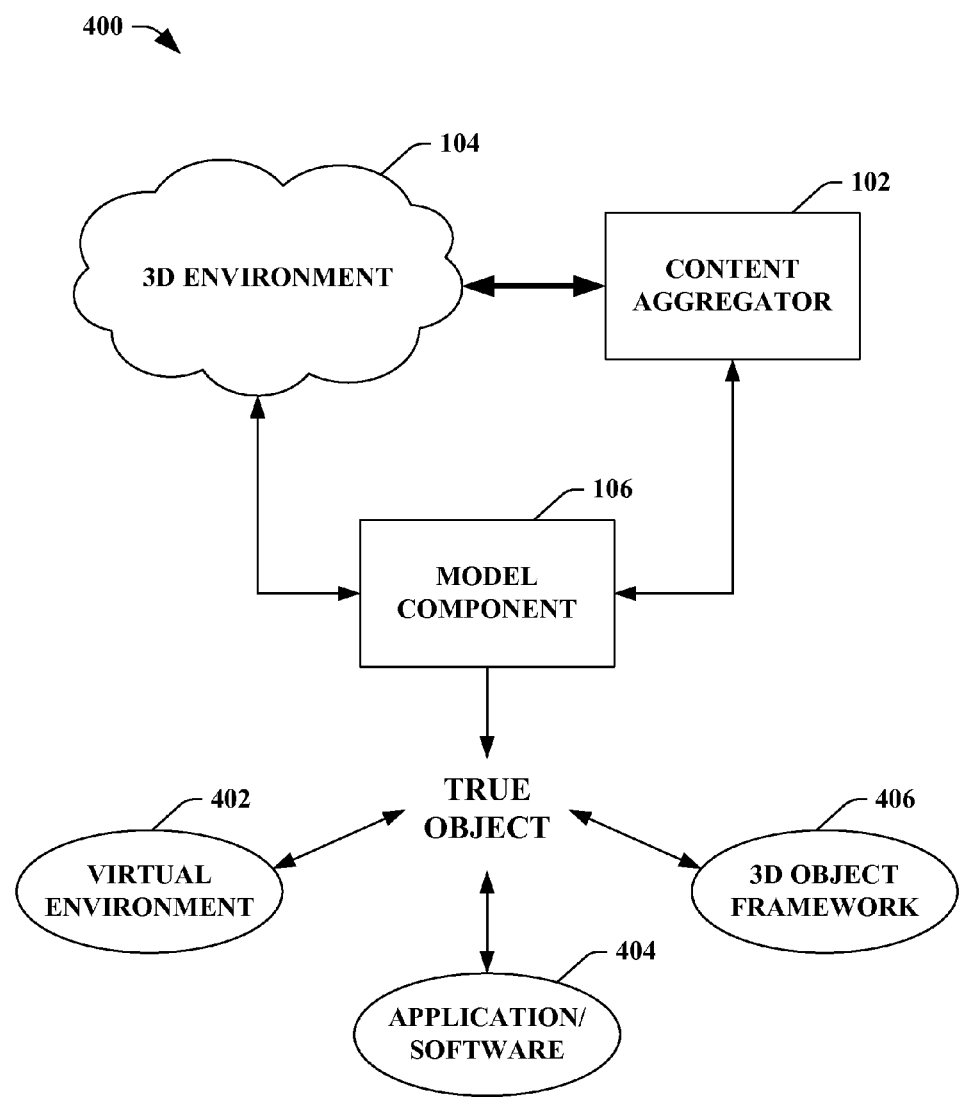
FIG. 4 illustrates a block diagram of an exemplary system that facilitates utilizing a true object identified from the true 3D geometric model.

FIG. 4 illustrates a system 400 that facilitates utilizing a true object identified from the true 3D geometric model. The system 400 can include the model component 106 that can analyze a 3D object constructed by the content aggregator 102 that assembles two or more photographs that depict a portion of the physical real world based upon each photograph's point-of-view. Based upon such analysis, the model component 106 can extrapolate physical real world properties and create a model that has such real world properties (e.g., dimensions, proportions, surfaces, scales, lengths, size, color, texture, physical properties, weight, chemical composition, etc.). This true 3D geometric model can be, but is not limited to being, a graphical representation, a blueprint, a wire framework, a wire frame, a wire frame model, a skeleton, and or any other displayable item that represents a portion of the 3D object with real world accurate attributes/properties.

As discussed, the true 3D geometric model can be analyzed with dimensional analysis in order to identify objects or items that are recognizable. For instance, in the car example discussed above, a portion of the true 3D geometric model can be identified as a low-dimensional manifold (e.g., a muffler, a rear-view mirror, etc.). By identifying a portion of the true 3D geometric model as a low-dimensional manifold, such portion of the model can be a true object (e.g., the true 3D geometric model can comprise of a plurality of true objects, wherein a true object is a portion of the true 3D geometric model that has been identified and is recognizable with dimensional analysis).

This true object or the identifiable portion of the true 3D geometric model can be implemented in connection with a virtual environment 402, a portion of application and/or software 404, and/or a disparate 3D object framework 406. The true object can be imported into a virtual environment 402 in order, wherein such true object is a virtual representation of real objects. In other words, the real life objects from the 2D images or photographs can be the basis of the virtual reality. For example, a collection of photos of a famous building can be aggregated and assembled to construct a 3D object of such famous building. This 3D object can be the basis for the extrapolation of a true 3D geometric model having physical real world dimensions, properties, attributes, etc. From this true 3D geometric model, objects and/or items can be readily identifiable utilizing, for example, dimensional analysis. These identified objects or items can be imported into the virtual environment 402. In other words, rather than creating the famous building, the famous building can be imported based on the extrapolated data from the 3D object created from 2D content. For instance, a social environment or network can allow a user to create an avatar, a house, etc., wherein the true 3D geometric model can be utilized therewith. It is to be appreciated that the virtual environment can be a social network, an online community, an online virtual world, a 3D online virtual world, etc.

The true object or identified portion of true 3D geometric model can be further utilized with an application or software 404. For instance, the true 3D geometric model can be utilized with a drafting application based on the architectural accurate characteristics. With dimensions, proportions, and attributes reflecting those of the physical real world, the following can utilize the true object: drafting applications, simulators (e.g., car crash simulating programs, a program or application that simulates reactions to a stimulus, natural disaster scenario, etc.), graphic designer programs, programs utilizing blueprint information, applications, geographic applications, mapping programs, navigation programs, designer software, etc.

The true object can further be utilized in connection with the 3D object as a 3D object framework 406. In particular, the true object can be a skeleton for the 3D object it originated (e.g., exposed in areas that are not represented by 2D content within the assembled 3D object), wherein 2D content can be overlaid upon the skeleton. In another instance, the true object can be utilized to create or construct a 3D object in connection with mapping 2D content onto the 3D object.

Figure 5:
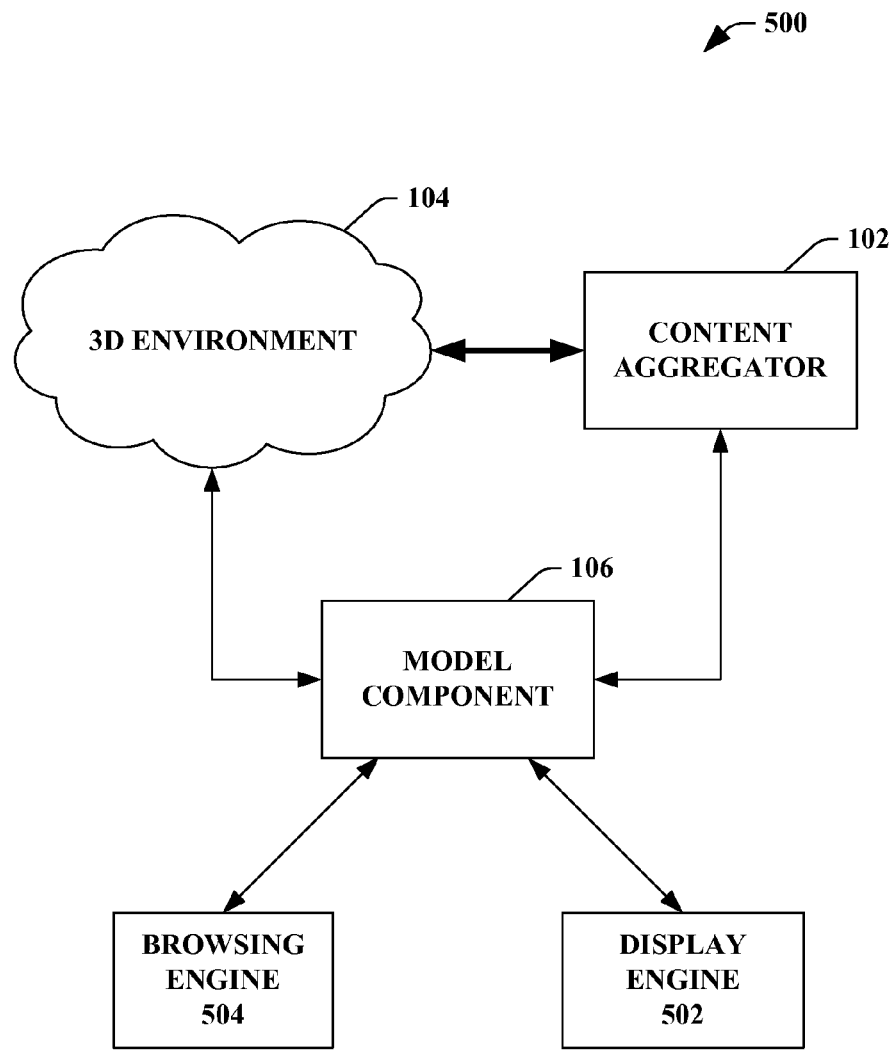
FIG. 5 illustrates a block diagram of exemplary system that facilitates utilizing a display technique and/or a browse technique in accordance with the subject innovation.

FIG. 5 illustrates a system 500 that facilitates utilizing a display technique and/or a browse technique in accordance with the subject innovation. The system 500 can include the content aggregator 102, the 3D environment 104, and the model component 106 as described above. The system 500 can further include a display engine 502 that enables seamless pan and/or zoom interaction with any suitable data (e.g., 3D object data, 2D imagery, content, the true 3D geometric model, a portion of the true 3D geometric model, an object identified from the true 3D geometric model, a modified portion of the true 3D geometric model, etc.), wherein such data can include multiple scales or views and one or more resolutions associated therewith. In other words, the display engine 502 can manipulate an initial default view for displayed data by enabling zooming (e.g., zoom in, zoom out, etc.) and/or panning (e.g., pan up, pan down, pan right, pan left, etc.) in which such zoomed or panned views can include various resolution qualities. The display engine 502 enables visual information to be smoothly browsed regardless of the amount of data involved or bandwidth of a network. Moreover, the display engine 502 can be employed with any suitable display or screen (e.g., portable device, cellular device, monitor, plasma television, etc.). The display engine 502 can further provide at least one of the following benefits or enhancements: 1) speed of navigation can be independent of size or number of objects (e.g., data); 2) performance can depend on a ratio of bandwidth to pixels on a screen or display; 3) transitions between views can be smooth; and 4) scaling is near perfect and rapid for screens of any resolution. It is to be appreciated and understood that the display engine 502 can be substantially similar to the display engine 102 described above.

For example, an image can be viewed at a default view with a specific resolution. Yet, the display engine 502 can allow the image to be zoomed and/or panned at multiple views or scales (in comparison to the default view) with various resolutions. Thus, a user can zoom in on a portion of the image to get a magnified view at an equal or higher resolution. By enabling the image to be zoomed and/or panned, the image can include virtually limitless space or volume that can be viewed or explored at various scales, levels, or views with each including one or more resolutions. In other words, an image can be viewed at a more granular level while maintaining resolution with smooth transitions independent of pan, zoom, etc. Moreover, a first view may not expose portions of information or data on the image until zoomed or panned upon with the display engine 502.

A browsing engine 504 can also be included with the system 500. The browsing engine 504 can leverage the display engine 502 to implement seamless and smooth panning and/or zooming for any suitable data browsed in connection with at least one of the Internet, a network, a server, a website, a web page, the 3D environment 106, the true 3D geometric model, a portion of the true 3D geometric model, an object identified from the true 3D geometric model, a modified portion of the true 3D geometric model, and the like. It is to be appreciated that the browsing engine 504 can be a stand-alone component, incorporated into a browser, utilized with in combination with a browser (e.g., legacy browser via patch or firmware update, software, hardware, etc.), and/or any suitable combination thereof. For example, the browsing engine 504 can be incorporate Internet browsing capabilities such as seamless panning and/or zooming to an existing browser. For example, the browsing engine 504 can leverage the display engine 502 in order to provide enhanced browsing with seamless zoom and/or pan on a 3D object or a true 3D geometric model, wherein various scales or views can be exposed by smooth zooming and/or panning.

Figure 6:
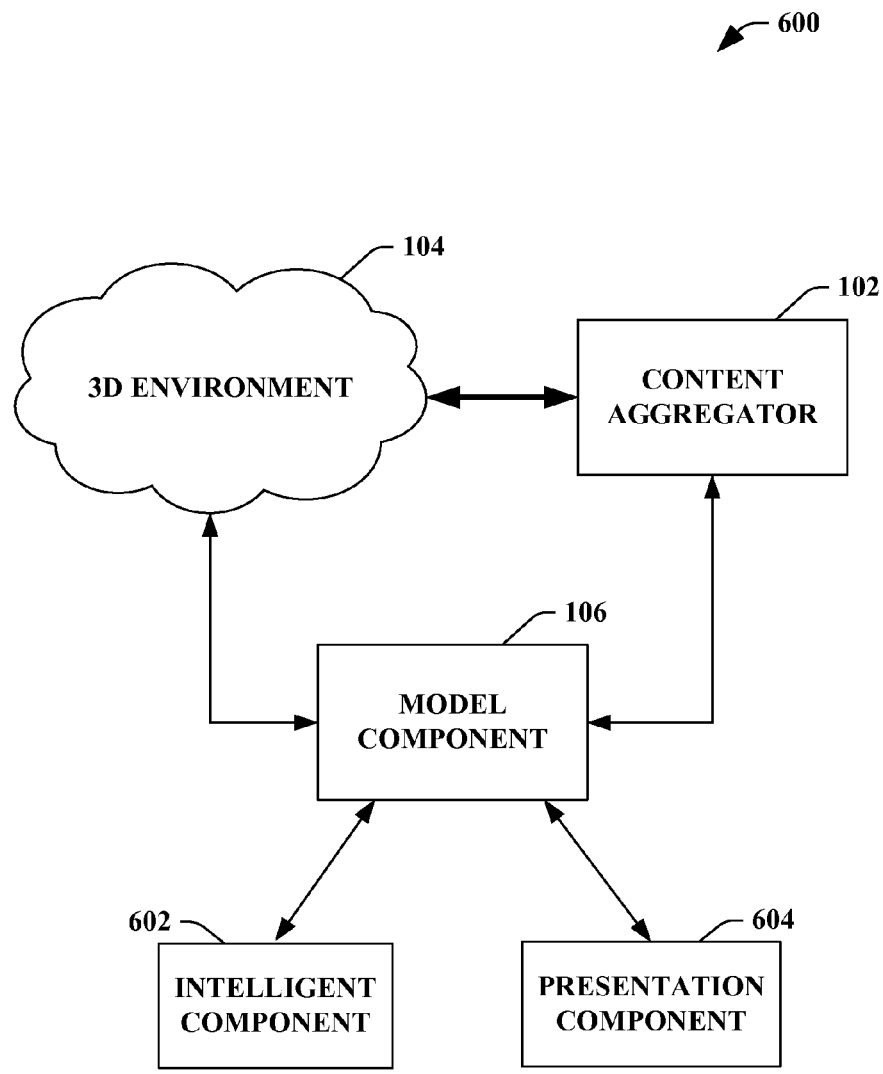
FIG. 6 illustrates a block diagram of an exemplary system that facilitates automatically identifying real world properties and dimensions from a 3D image or object created from 2D content.

FIG. 6 illustrates a system 600 that employs intelligence to facilitate automatically identifying real world properties and dimensions from a 3D image or object created from 2D content. The system 600 can include the content aggregator 102, the 3D environment 104, and the model component 102, which can be substantially similar to respective aggregators, environments, and components described in previous figures. The system 600 further includes an intelligent component 602. The intelligent component 602 can be utilized by the model component 106 to facilitate constructing a true 3D geometric model from a 3D image assembled from 2D images or photography. For example, the intelligent component 602 can infer true 3D geometry, a true 3D geometric model from a 3D object, a physical real world dimension, a physical real world proportion, an attribute reflective of the physical real world, identifiable objects from a true 3D geometric model, a low-dimensional manifold, a tag for an identified object or item, a reduction of an item or object to a lower dimension, import configurations, user preferences, virtual environment import settings, virtual model extrapolation data, etc.

The intelligent component 602 can employ value of information (VOI) computation in order to identify optimal dimensional reduction settings to identify and reduce objects from a true 3D geometric model. For instance, by utilizing VOI computation, the most ideal and/or appropriate dimensions of an identified object can be maintained and an optimal low-dimensional manifold can be generated. Moreover, it is to be understood that the intelligent component 602 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

The model component 106 can further utilize a presentation component 604 that provides various types of user interfaces to facilitate interaction between a user and any component coupled to the model component 106. As depicted, the presentation component 604 is a separate entity that can be utilized with the model component 106. However, it is to be appreciated that the presentation component 604 and/or similar view components can be incorporated into the model component 106 and/or a stand-alone unit. The presentation component 604 can provide one or more graphical user interfaces (GUIs), command line interfaces, and the like. For example, a GUI can be rendered that provides a user with a region or means to load, import, read, etc., data, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such as vertical and/or horizontal scroll bars for navigation and toolbar buttons to determine whether a region will be viewable can be employed. For example, the user can interact with one or more of the components coupled and/or incorporated into the model component 106.

The user can also interact with the regions to select and provide information via various devices such as a mouse, a roller ball, a touchpad, a keypad, a keyboard, a touch screen, a pen and/or voice activation, a body motion detection, for example. Typically, a mechanism such as a push button or the enter key on the keyboard can be employed subsequent entering the information in order to initiate the search. However, it is to be appreciated that the claimed subject matter is not so limited. For example, merely highlighting a check box can initiate information conveyance. In another example, a command line interface can be employed. For example, the command line interface can prompt (e.g., via a text message on a display and an audio tone) the user for information via providing a text message. The user can then provide suitable information, such as alpha-numeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, EGA, VGA, SVGA, etc.) with limited graphic support, and/or low bandwidth communication channels.

Figure 7:
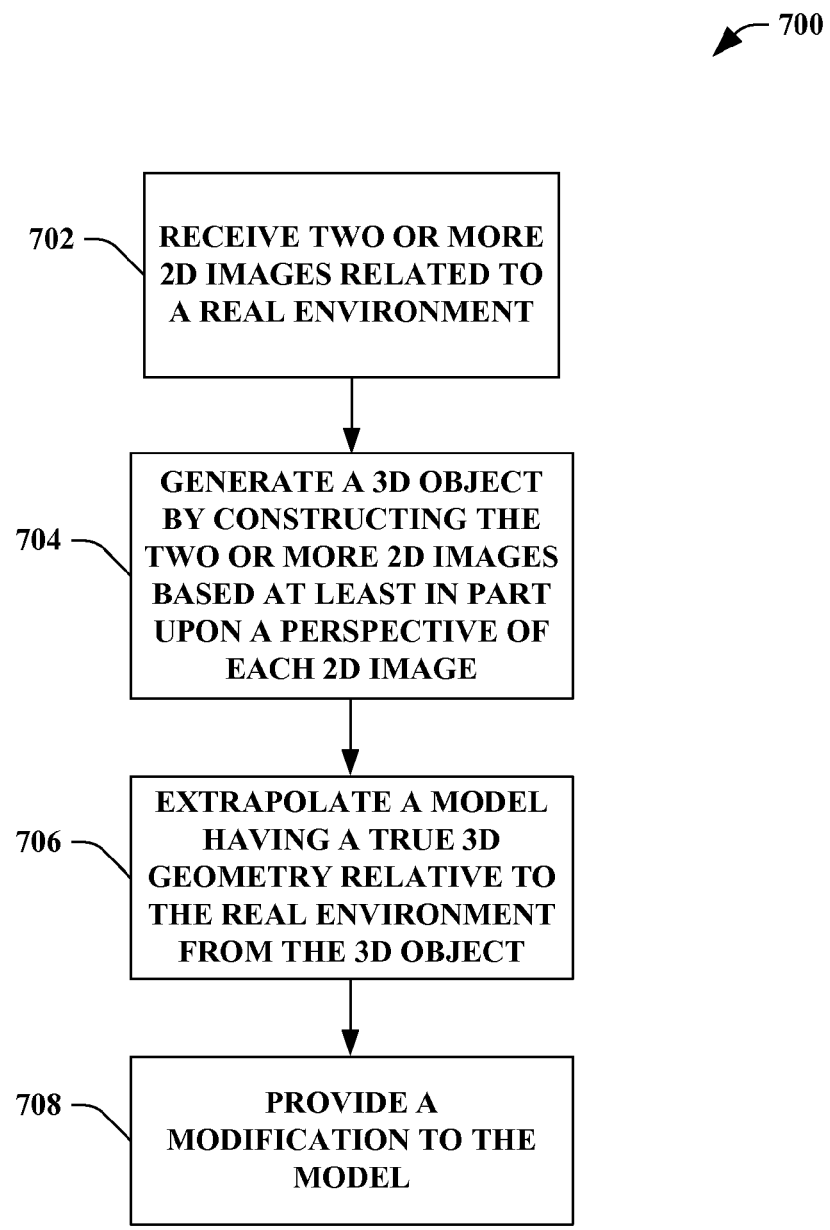
FIG. 7 illustrates an exemplary methodology for providing an object with a low-dimensional manifold from a true 3D geometric model, wherein the object can be modified.
Figure 8:
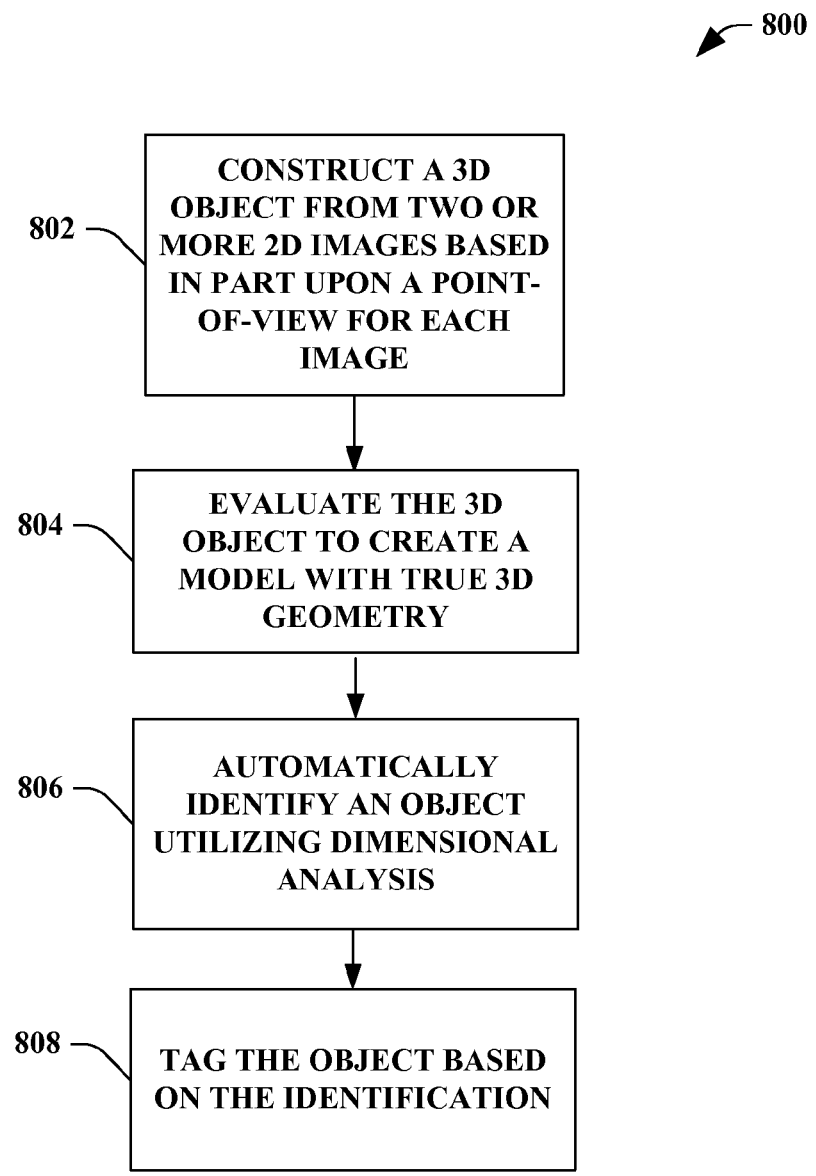
FIG. 8 illustrates an exemplary methodology that facilitates extrapolating a true 3D geometric model with real-world accurate dimensions and automatically tagging identified objects within such model.

FIGS. 7-8 illustrate methodologies and/or flow diagrams in accordance with the claimed subject matter. For simplicity of explanation, the methodologies are depicted and described as a series of acts. It is to be understood and appreciated that the subject innovation is not limited by the acts illustrated and/or by the order of acts. For example acts can occur in various orders and/or concurrently, and with other acts not presented and described herein. Furthermore, not all illustrated acts may be required to implement the methodologies in accordance with the claimed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

FIG. 7 illustrates a method 700 that facilitates providing an object with a low-dimensional manifold from a true 3D geometric model, wherein the object can be modified. At reference numeral 702, two or more images related to a real environment can be received. For example, the two or more images can be any suitable 2D media or content such as, but not limited to, video, photography, a photo, a picture, a still frame from a video, etc. It is to be appreciated that the two or more images can represent or depict a portion of a physical real world (e.g., a photograph of a bird depicts the bird in the physical real world).

At reference numeral 704, a 3D object can be generated by constructing the two or more 2D images based at least in part upon a perspective of each 2D image. For example, a collection of photographs can be assembled to create a 3D representation of the objects or portion of the physical real world depicted in the photographs. In one example, a first photo of a right side, a second photo of a left side, and a third photo of a top side can be arranged based on their perspective to create a 3D object that can be displayed, browsed, navigated, explored, etc.

At reference numeral 706, a model having true 3D geometry relative to the real environment can be extrapolated from the 3D object. The 3D object can be evaluated and a 3D model having accurate dimensions, properties, attributes, scales, etc. can be created. In particular, the true 3D geometric model can have true geometry in comparison to the real world, as well as real world dimensions, proportions, surfaces, scales, lengths, size, color, texture, physical properties, weight, chemical composition, etc. This true 3D geometric model can be illustrated as, but is not limited to being, a graphical representation, a blueprint, a wire framework, a wire frame, a wire frame model, a skeleton, and or any other displayable item that represents a portion of the 3D object with real world accurate attributes/properties.

At reference numeral 708, a modification to the model can be provided. For example, the true 3D geometric model can be modified, manipulated, or edited. In one specific instance, the true 3D geometric model can be evaluated with dimensional analysis in order to identify an object having a low-dimension. Such identified object with low-dimension can be modified according to user preferences, etc. With the identified object having a low-dimension but still having recognizable core features, the object can be manipulated. For example, a human face can have a plurality of dimensions but can be reduced to a lower amount of dimensions representing core features (e.g., face identified with core features such as eyes, nose, mouth, etc.). This human face can be manipulated by, for instance, changing the distance between eyes, modifying the mouth shape, distorting the nose, etc.

FIG. 8 illustrates a method 800 for extrapolating a true 3D geometric model with real-world accurate dimensions and automatically tagging identified objects within such model. At reference numeral 802, a 3D object can be constructed from two or more 2D images based in part upon a point-of-view for each image. In general, a 3D object or image can be created to enable exploration within a 3D virtual environment, wherein the 3D object or image is constructed from 2D content of the object or image. The 2D imagery is combined in accordance with the perspective or point-of-view of the imagery to enable an assembled 3D object that can be navigated and viewed (e.g., the 3D object as a whole includes a plurality of 2D images or content). For example, 2D pictures of a pyramid (e.g., a first picture of a first side, a second picture of a second side, a third picture of a third side, a fourth picture of a fourth side, and a fifth picture of a bottom side) can be aggregated to assemble a 3D object that can be navigated or browsed in a 3D virtual environment. It is to be appreciated that the aggregated or collected 2D content can be any suitable number of images or content.

At reference numeral 804, the 3D object can be evaluated to create a model with true 3D geometry. For example, a model can be extrapolated from the 3D object, in which the model can have real world attributes such as dimensions, proportions, surfaces, scales, lengths, size, color, texture, physical properties, weight, chemical composition, etc., wherein such attributes reflect those in real life. At reference numeral 806, a true object can be automatically identified utilizing, for instance, dimensional analysis. A portion of the true 3D geometric model can be identified as a low-dimensional manifold utilizing dimensional analysis. By identifying a portion of the true 3D geometric model as a low-dimensional manifold, such portion of the model can be a true object (e.g., the true 3D geometric model can comprise of a plurality of true objects, wherein a true object is a portion of the true 3D geometric model that has been identified and is recognizable with dimensional analysis). At reference numeral 808, the object can be tagged based on the identification. In other words, the identified portion of the true 3D geometric model can be tagged with a portion of metadata describing the identified object or item.

Figure 9:
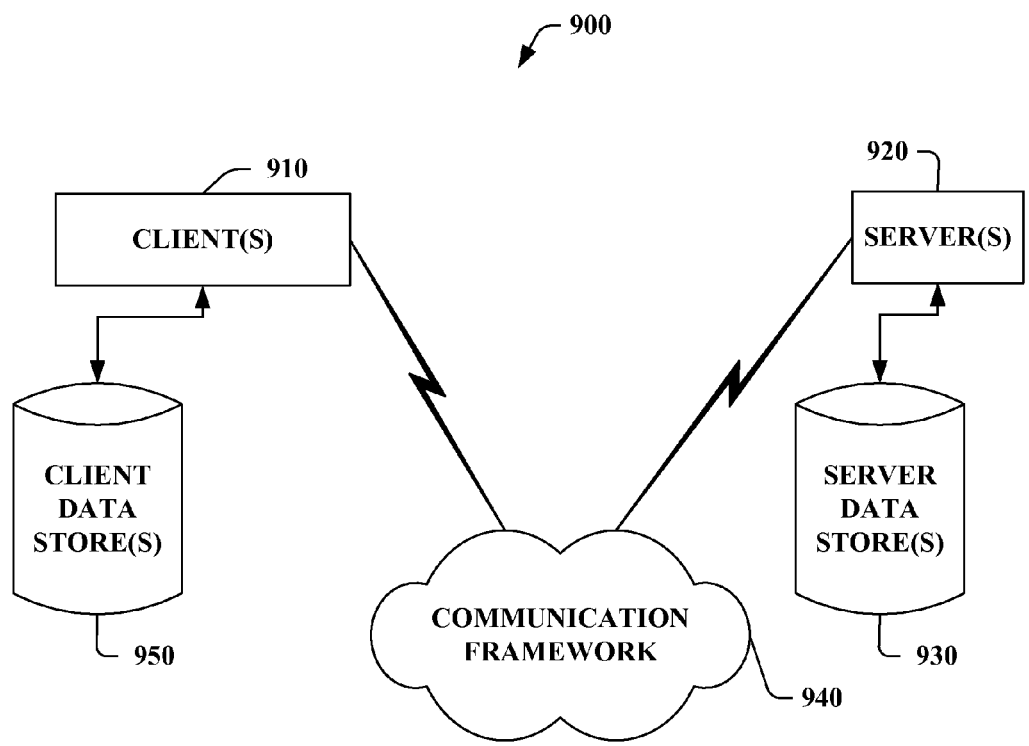
FIG. 9 illustrates an exemplary networking environment, wherein the novel aspects of the claimed subject matter can be employed.
Figure 10:
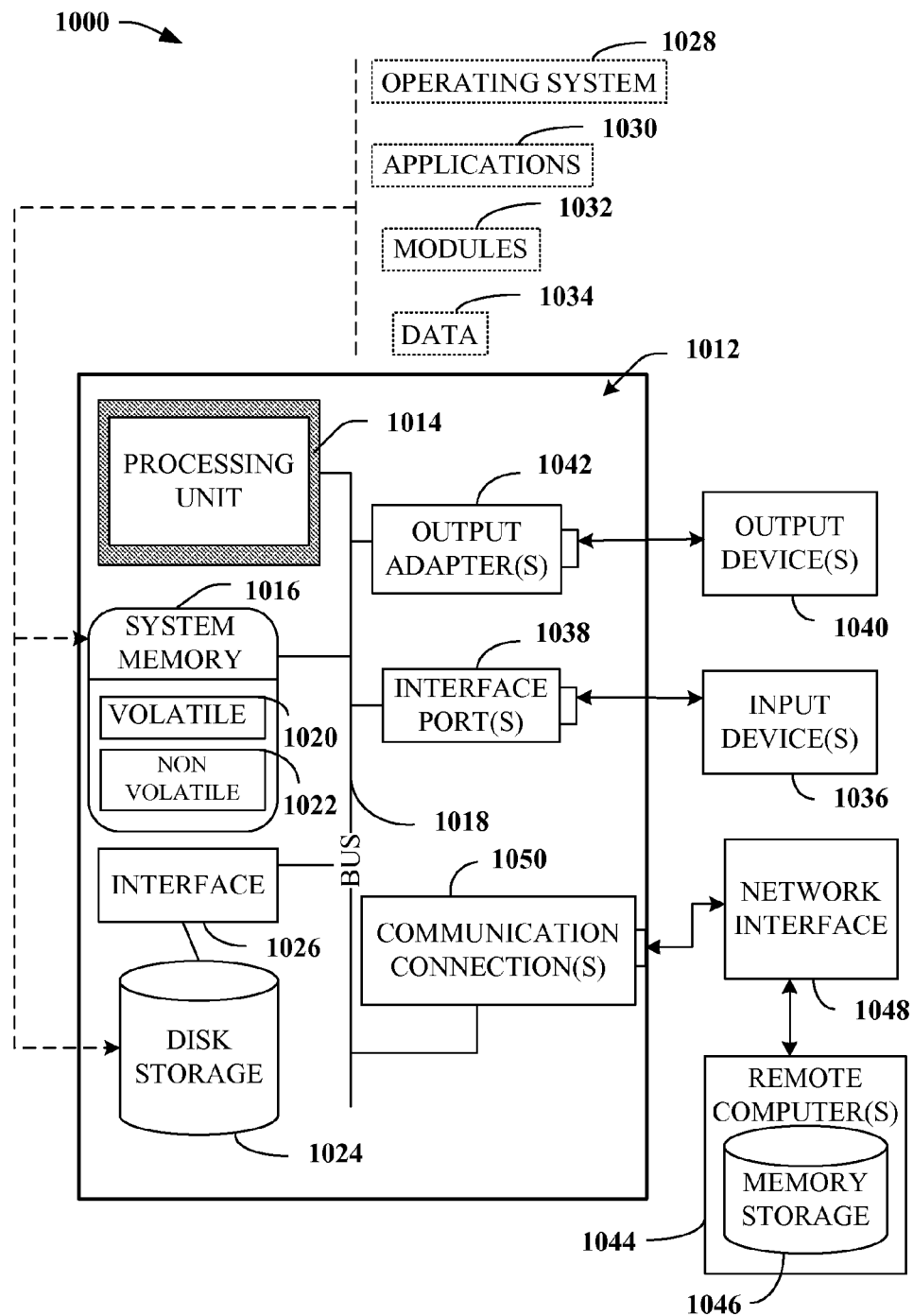
FIG. 10 illustrates an exemplary operating environment that can be employed in accordance with the claimed subject matter.

In order to provide additional context for implementing various aspects of the claimed subject matter, FIGS. 9-10 and the following discussion is intended to provide a brief, general description of a suitable computing environment in which the various aspects of the subject innovation may be implemented. For example, the model component can extrapolate a true 3D geometric model accurate to real-world dimensions from a 3D image or object created from 2D content, as described in the previous figures, can be implemented in such suitable computing environment. While the claimed subject matter has been described above in the general context of computer-executable instructions of a computer program that runs on a local computer and/or remote computer, those skilled in the art will recognize that the subject innovation also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the claimed subject matter may also be practiced in distributed computing environments where certain tasks are performed by remote processing devices that are linked through a communications network. However, some, if not all, aspects of the subject innovation may be practiced on stand-alone computers. In a distributed computing environment, program modules may be located in local and/or remote memory storage devices.

FIG. 9 is a schematic block diagram of a sample-computing environment 900 with which the claimed subject matter can interact. The system 900 includes one or more client(s) 910. The client(s) 910 can be hardware and/or software (e.g., threads, processes, computing devices). The system 900 also includes one or more server(s) 920. The server(s) 920 can be hardware and/or software (e.g., threads, processes, computing devices). The servers 920 can house threads to perform transformations by employing the subject innovation, for example.

One possible communication between a client 910 and a server 920 can be in the form of a data packet adapted to be transmitted between two or more computer processes. The system 900 includes a communication framework 940 that can be employed to facilitate communications between the client(s) 910 and the server(s) 920. The client(s) 910 are operably connected to one or more client data store(s) 950 that can be employed to store information local to the client(s) 910. Similarly, the server(s) 920 are operably connected to one or more server data store(s) 930 that can be employed to store information local to the servers 920.

With reference to FIG. 10, an exemplary environment 1000 for implementing various aspects of the claimed subject matter includes a computer 1012. The computer 1012 includes a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable programmable ROM (EEPROM), or flash memory. Volatile memory 1020 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1012 also includes removable/non-removable, volatile/non-volatile computer storage media. FIG. 10 illustrates, for example a disk storage 1024. Disk storage 1024 includes, but is not limited to, devices like a magnetic disk drive, floppy disk drive, tape drive, Jaz drive, Zip drive, LS-100 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to the system bus 1018, a removable or non-removable interface is typically used such as interface 1026.

It is to be appreciated that FIG. 10 describes software that acts as an intermediary between users and the basic computer resources described in the suitable operating environment 1000. Such software includes an operating system 1028. Operating system 1028, which can be stored on disk storage 1024, acts to control and allocate resources of the computer system 1012. System applications 1030 take advantage of the management of resources by operating system 1028 through program modules 1032 and program data 1034 stored either in system memory 1016 or on disk storage 1024. It is to be appreciated that the claimed subject matter can be implemented with various operating systems or combinations of operating systems.

A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the bus 1018. While communication connection 1050 is shown for illustrative clarity inside computer 1012, it can also be external to computer 1012. The hardware/software necessary for connection to the network interface 1048 includes, for exemplary purposes only, internal and external technologies such as, modems including regular telephone grade modems, cable modems and DSL modems, ISDN adapters, and Ethernet cards.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

There are multiple ways of implementing the present innovation, e.g., an appropriate API, tool kit, driver code, operating system, control, standalone or downloadable software object, etc. which enables applications and services to use the advertising techniques of the invention. The claimed subject matter contemplates the use from the standpoint of an API (or other software object), as well as from a software or hardware object that operates according to the advertising techniques in accordance with the invention. Thus, various implementations of the innovation described herein may have aspects that are wholly in hardware, partly in hardware and partly in software, as well as in software.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A method comprising:
receiving, by a computing device and from a scanning device, a plurality of color 2D images;
analyzing the plurality of color 2D images for similarities to identify 2D images representing points-of-view of an object in a physical environment;
obtaining a point cloud that describes a third dimension of the object;
generating, by the computing device, a 3D mesh model of the object based at least in part on the identified 2D images and the point cloud that describes the third dimension of the object, the 3D mesh model including surfaces that are scaled based at least in part on surfaces of the object;
utilizing a value of information (VOI) analysis to identify one or more dimensional reduction settings;
analyzing the 3D mesh model based at least in part on the one or more dimensional reduction settings to identify another object that is represented in the 3D mesh model; and
exporting the 3D mesh model.

2. The method of claim 1, further comprising:
enabling a user to view the 3D mesh model and to modify the 3D mesh model.

3. The method of claim 1, wherein the 3D mesh model is exported to a virtual environment.

4. The method of claim 1, further comprising:
performing dimensionality reduction on the 3D mesh model to reduce a number of features of the 3D mesh model.

5. The method of claim 1, wherein the generating includes aligning the identified 2D images onto one or more surfaces of the 3D mesh model.

6. One or more computer-readable hardware storage devices storing computer-executable instructions that, when executed by one or more processors, cause the one or more processors to perform the method of claim 1.

7. One or more computer-readable hardware storage devices storing computer-executable instructions that, when executed by the one or more processors, cause the one or more processors to perform acts comprising:
collecting, from a first source, a plurality of 2D color images of an object in a physical environment;
collecting, from a second source, data of the object in the physical environment, the data being of a different data type than the plurality of 2D color images and the second source being different than the first source;
creating a 3D mesh model of the object based at least in part on the plurality of 2D color images and the data, the 3D mesh model being sized based at least in part on a size of the object, the creating including aligning the plurality of 2D color images;
utilizing a value of information (VOI) analysis to identify one or more dimensional reduction settings;
analyzing the 3D mesh model based at least in part on the one or more dimensional reduction settings to identify another object that is represented in the 3D mesh model; and
exporting the 3D mesh model.

8. The one or more computer-readable hardware storage devices of claim 7, wherein the acts further comprise:
enabling a user to view the 3D mesh model and to modify the 3D mesh model.

9. The one or more computer-readable hardware storage devices of claim 7, wherein the 3D mesh model is exported to a virtual environment.

10. The one or more computer-readable hardware storage devices of claim 7, wherein the acts further comprise:
performing dimensionality reduction on the 3D mesh model to reduce a number of features of the 3D mesh model.

11. The one or more computer-readable hardware storage devices of claim 7, wherein the plurality of 2D color images are aligned by overlaying the plurality of 2D color images onto one or more surfaces of the 3D mesh model.

12. The one or more computer-readable hardware storage devices of claim 7, wherein the acts further comprise scaling a surface of the 3D model based at least in part on a corresponding surface of the object.

13. The one or more computer-readable hardware storage devices of claim 7, wherein the 3D mesh model is exported into a virtual gaming environment.

14. A system comprising:
one or more processors;
memory communicatively coupled to the one or more processors;
a content aggregator stored in memory and executable by the one or more processors to receive, from a first source, a plurality of images representing points-of-view of an object in a physical environment and receive, from a second source, scan data of the object in the physical environment, the scan data being of a different data type than the plurality of images and the second source being different than the first source;
a model component stored in the memory and executable by the one or more processors to:
generate a 3D mesh model of the object based at least in part on the plurality of images and the scan data, the 3D mesh model including surfaces that are scaled based at least in part on surfaces of the object, the generating including aligning the plurality of images; and
utilize a value of information (VOI) analysis to identify one or more dimensional reduction settings and analyze the 3D mesh model based at least in part on the one or more dimensional reduction settings to identify another object that is represented in the 3D mesh model; and
an interface communicatively coupled to the one or more processors and configured to export the 3D mesh model.

15. The system of claim 14, wherein the model component is further executable by the one or more processors to perform dimensionality reduction on the 3D mesh model to reduce a number of features of the 3D mesh model.

16. The system of claim 14, wherein the interface is configured to export the 3D mesh model to a virtual environment.

17. The system of claim 14, wherein the model component is configured to align the plurality of images by overlaying the plurality of images onto one or more surfaces of the 3D mesh model.

18. The system of claim 14, further comprising:
an output device communicatively coupled to the one or more processors, the output device configured to display the 3D mesh model.

19. The system of claim 14, further comprising:
an input device communicatively coupled to the one or more processors, the input device configured to receive an input to modify the 3D mesh model.

20. The system of claim 14, wherein the interface is configured to export the 3D mesh model to a virtual gaming environment.

* * * * *